(12) United States Patent
Bommersbach et al.

(10) Patent No.: US 7,330,298 B2
(45) Date of Patent: Feb. 12, 2008

(54) OPTICAL SYSTEM AND METHOD FOR INCREASING IMAGE RESOLUTION AND/OR DITHERING IN PROJECTION APPLICATIONS

(75) Inventors: William M. Bommersbach, Richardson, TX (US); Donald C. Whitney, Allen, TX (US); Frederick C. Wedemeier, Richardson, TX (US); Roger S. Carver, Richardson, TX (US); Steven M. Penn, Plano, TX (US); Stephen W. Marshall, Richardson, TX (US); Frank J. Poradish, Plano, TX (US); Donald A. Powell, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 292 days.

(21) Appl. No.: 11/051,373

(22) Filed: Feb. 4, 2005

(65) Prior Publication Data

US 2006/0176323 A1 Aug. 10, 2006

(51) Int. Cl.
*G02B 26/00* (2006.01)
*G09G 3/34* (2006.01)
(52) U.S. Cl. .................................. 359/292; 345/85
(58) Field of Classification Search ............... 345/84, 345/85, 87, 89; 359/291, 292; 353/30, 31
See application file for complete search history.

(56) References Cited

U.S. PATENT DOCUMENTS

| 5,453,778 | A | 9/1995 | Venkateswar et al. |
| 6,486,938 | B1 | 11/2002 | Morita et al. |
| 6,574,032 | B1* | 6/2003 | Roddy et al. ............... 359/290 |
| 6,849,825 | B2 | 2/2005 | Tanaka |
| 7,126,624 | B2 | 10/2006 | Nakaya et al. |
| 7,182,463 | B2* | 2/2007 | Conner et al. ................ 353/31 |
| 7,184,194 | B2* | 2/2007 | Wood .......................... 359/291 |
| 2004/0239819 | A1* | 12/2004 | Ohara et al. ................. 348/771 |
| 2005/0168851 | A1 | 8/2005 | Sandstrom |
| 2006/0145975 | A1* | 7/2006 | Kempf et al. .................. 345/84 |
| 2006/0176362 | A1 | 8/2006 | Penn et al. |
| 2006/0244759 | A1* | 11/2006 | Kempf ........................ 345/611 |
| 2006/0244930 | A1* | 11/2006 | Hayashi et al. ............... 353/97 |
| 2007/0040992 | A1* | 2/2007 | Kim ............................ 353/34 |

* cited by examiner

*Primary Examiner*—David N. Spector
(74) *Attorney, Agent, or Firm*—Dawn V. Stephens; W. James Brady, III; Frederick J. Telecky, Jr.

(57) ABSTRACT

An optical system for projecting an image having x and y axes onto a image plane is provided. The system includes an SLM device spaced from the image plane, the SLM device having a plurality of pixels operable to project pixels of the image onto the image plane and positioned such that the individual pixels of the projected image are oriented at substantially 45 degrees relative to the x and y axes of the image. The system further includes an optic element disposed between the SLM device and the image plane and a linear displacement device operatively connected to and operable to selectively displace at least one of the SLM device and the optic element. A method for projecting an image onto a image plane is also provided.

11 Claims, 15 Drawing Sheets

PHASE 0

PHOTOSENSITIVE MATERIAL

EXPOSURE REFERENCE 302
303
DMD ARRAY
402

PHASE 1

PHASE 2

PHASE 3

PHASE 4

PHASE 5

PHASE 0

PHASE 1

PHASE 2

PHASE 3

PHASE 4

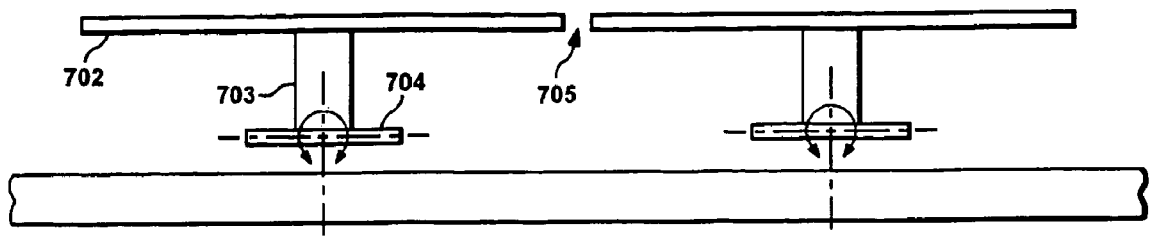
FIG. 7
*(PRIOR ART)*
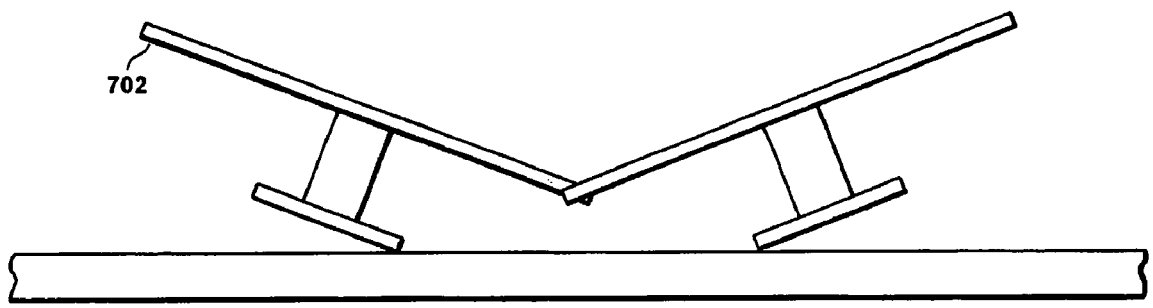
FIG. 8
*(PRIOR ART)*
FIG. 9
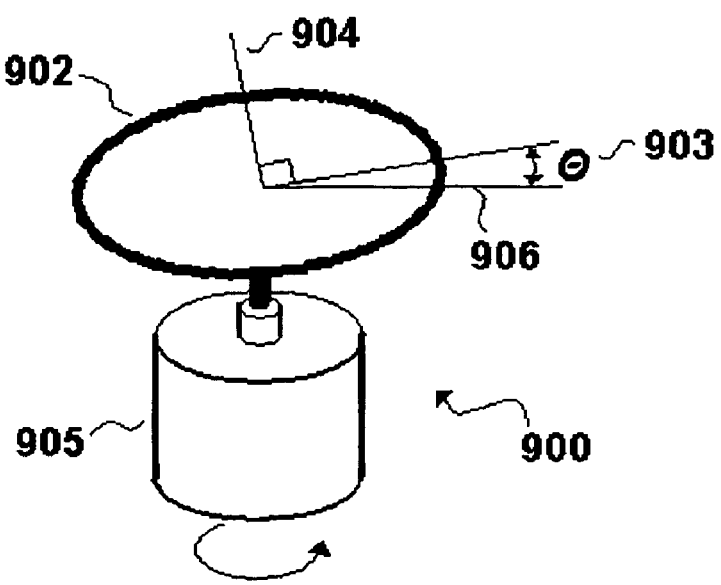

OPTICAL SYSTEM AND METHOD FOR INCREASING IMAGE RESOLUTION AND/OR DITHERING IN PROJECTION APPLICATIONS

CROSS-REFERENCE TO RELATED APPLICATIONS

This application is related to U.S. patent application Ser. No. 11/051,660 entitled "Optical System and Method for Increasing Image Resolution and/or Dithering in Printing Applications."

TECHNICAL FIELD

Disclosed embodiments herein relate generally to the field of image display systems using Spatial Light Modulators (SLMs), and more particularly to methods for improving the visual quality of an image.

BACKGROUND

SLMs are used in many applications, two of which are display systems and printing systems. SLMs are increasingly being used because they have the benefit of high resolution while consuming lower power and less bulk than conventional Cathode Ray Tube technology. Examples of two well known SLM devices include Liquid Crystal Displays (LCDs) and Digital Micromirror Devices (DMDs). The SLM will typically consist of an array of picture elements, or pixels, which modulates light according to a spatial pattern on the device.

Generally, an LCD system used in projection systems consists of three LCD panels in which the primary colors, red, green, and blue, are combined from the three panels to form the desired image. An LCD panel consists of a liquid crystal material sandwiched between transmissive layers and divided into an array of individual picture elements. Each picture element can individually have an electric signal applied that causes the material to align in predictable ways. Light is passed to the panels and individual picture elements either allow the light to pass through or block the light. By modulating the opening and closing of the picture elements, an image is produced which is then directly viewed or projected on to the image plane or display plane through a display lens. Traditionally, the array is aligned with the horizontal and vertical axes.

Another version of an LCD system is known as Liquid Crystal on Silicon, which combines some of the features of an LCD panel with a DMD device. An LCD type device is placed over a reflective surface and the individual picture element either allows light to pass to the reflective surface or light is blocked from the reflective surface. The reflected light corresponding to the picture element is passed through the imaging system, usually combining three separate color images of red, green, and blue to the display plane.

DMDs are micromechanical devices that typically include an array of small reflective surfaces, or mirrors, on a semiconductor wafer to which an electrical signal is applied to deflect the mirror and change the reflected light applied to the device. A DMD-based system is created by projecting a beam of light to the device and selectively altering individual micro-mirrors with image data, and directly viewing or projecting the selected reflected portions to an image plane such as a display screen or printing surface. Each individual micromirror is addressable by an electronic signal and makes up one "display element" of the DMD. In many contexts, a single pixel of a DMD or other SLM device corresponds with a single image pixel in a projection display or printing context, but there are other ways to address the SLM device in order to comprise a pixel element of more than or less than a single SLM device pixel.

Further, techniques are sometimes desired for dithering of the displayed or printed images are provided in the art so that jagged lines, screen-door effects, temporal anomalies, and other discontinuities and undesirable image effects are reduced.

SUMMARY OF THE SYSTEM AND METHOD

Disclosed herein are systems and methods for improving an image from a spatial light modulator, whose elements are viewed, projected or printed, where such elements are positioned such that their projection onto an image plane is approximately at a 45 degree rotation from the x and y axes of the image plane. The disclosed systems and methods further provide for the relative motion of the projected pixels in the image plane (whether for image display or printing) in order to increase image resolution and/or effect image dithering.

In the DMD context, the micro-mirrors of the devices are often referred to as the "pixels" of the DMD, as distinguished from the pixels of an image. The pixels of an image may individually consist of an image element formed by one or more pixels of the DMD, or in contrast, multiple image elements may be formed by the spatial displacement of image projection from a single DMD pixel.

Generally, projecting an image from an array of SLM pixels is accomplished by loading memory cells connected to the pixels. Once each memory cell is loaded, the corresponding display elements are reset so that the corresponding display element is turned "ON" or "OFF" in accordance with the ON or OFF state of the data in the memory cell. For example, to produce a bright spot in the projected image, the state of the pixel may be ON, such that the light from that pixel is directed out of the SLM and into a projection lens. Conversely, to produce a dark spot in the projected image, the state of the pixel may be OFF, such that the light is directed away from the projection lens.

Modulating the beam of light with a micromirror is used to vary the intensity of the reflected light. Although the micro-mirrors can be moved relative to the bias voltage applied, the typical operation is a digital bistable mode in which the mirrors are fully deflected at any one time. Generating short pulses and varying the duration of the pulse to an image bit changes the time in which the portion of the image bit is reflected to the image plane versus the time the image bit is reflected away, therefore distributing the correct amount of light to the image plane. This technique described above is Pulse-Width Modulation (PWM) and is used to achieve the level of illumination in both black/white as well as color systems.

For generating color images with a DMD system, one approach is to use three DMDs, one for each primary color of red, green, and blue (RGB). The light from corresponding pixels of each DMD is converged so that the viewer perceives the desired color. Another approach is to use a single DMD and a color wheel having sections of primary colors. Data for different colors is sequenced and synchronized to the color wheel so that the eye integrates sequential images into a continuous color image. Another approach uses two DMDs, with one switching between two colors and the other displaying a third color.

A common artifact of using individual picture elements to produce an image is that the resulting images may show the gaps that exist between picture elements. LCD display systems usually have a larger perceived gap than a comparable DMD based system when using a similar density of picture elements. The grid produced is also known as the screen-door effect and will become more pronounced as the image size is increased. By using a greater number of picture elements to produce the image, the effect can be reduced with the trade-off in higher cost and system complexity. Other discontinuities and structures on the SLMs can also distract from the desired image uniformity. A method is desired that reduces the screen-door effect and other artifacts while maintaining image clarity.

Printing applications for SLMs include photographic and electrophotographic printing, both of which are used to print pictures, characters, and drawings. While the traditional photographic printing using conventional film and optics is still in wide use, digital imaging has become popular and continues to grow. Digital images may be created directly with digital cameras, may be computer generated, or may be scanned from conventional photographs or film. Printing to photosensitive materials has many applications, some of which include printing directly to photographic paper, creating a master negative, and producing a no loss film master. The early method of reproducing digital images to photosensitive material from a CRT was expensive and had shortcomings such as insufficient phosphor response for certain colors when operating at high print speeds and poor resolution. SLMs offer advantages in the area of photographic printing such as high-speed imaging and lower cost. When used for photographic printing, the SLM does not need to operate at high frame rates and an SLM system may be designed with a sequential color system using one SLM module versus an additive system consisting of three SLMs, one for each color. Laser systems have also been used in photographic printing. However, laser systems use rotating mirrors that make them bulky, complex and expensive. Traditional photo paper does not work with a laser system and special paper adds additional cost.

Electrophotographic printing using an SLM is similar to a laser printer in that light is used to create an image on the printer drum. In the LCD context, a halogen or other light source is shone through an LCD panel, and the panel either lets the light pass or blocks the light, thereby creating image pixels on the drum. An LCD printer is sometimes referred to as a crystal shutter printer. Although not as well known as laser printers, LCD printers can produce print quality equivalent to that of laser printers. DMD printers work in a similar fashion to LCD printers. A light source is reflected from a DMD device and the resulting image is projected onto a charged print drum. Depending on the drum type, light photons either charge or discharge the drum where they strike and toner material is attracted to the charged or discharged areas respectively. The imaging material, which is also charged, passes over the drum and attracts the toner material onto the imaging material where the toner is typically fused to the print material by heat.

In both display systems and printing systems, increasing the resolution is a desired benefit that is directly perceived by the user. When utilizing an SLM device in an orthogonal array for either display or printing, the number of elements on the SLM device typically limits the resolution. Resolution is especially important in digital printing, where print densities of at least 300 pixels per inch are desired. An 8 inch by 10 inch image would require 2400 by 3000 pixels respectively. For an image projection or film created by an SLM, higher resolutions are desired because the resulting image is projected onto larger display planes.

Disclosed in this application is the projection of image pixels that are oriented with their axes at 45 degrees from the x and y axes of the projected images that they collectively form, resulting in their forming the collective image with diagonal or diamond-shaped pixel images. This 45-degree rotation of the SLM array has the advantage of increasing the image resolution while using a smaller dynamic image offset relative to a displacement approach when the axes of the pixels are aligned with that of the collective image. For example, the image resolution can be enhanced by a factor of two while using a dynamic image offset of only ½ the diagonal size of a projected pixel, whereas the same increase in image resolution in an aligned system would require displacement of a full projected pixel length. Advantages of rotating the image array include but are not limited to reducing the visible gaps between elements and reducing other discontinuities. It is additionally possible to move the projected image on the display plane or print medium in order to increase image resolution and/or to perform image dithering.

In one embodiment, the method comprises the orientation of the SLM in the optical path such that the projection of the SLM pixels is oriented at a 45 degree angle and wherein the image data from the SLM is presented to a print material that is stepped in increments of less than the diagonal length of a projected pixel, to effectively enhance the resolution of the SLM array. For example, the print material can be stepped in increments of ½ of the projected diagonal pixel size to effectively double the resolution of the SLM array. Advantages of this method include increasing the resolution and having the ability to print at high speeds through a cumulative exposure method.

Another method is provided that reduces the exposure complexity of the first embodiment. Complexity of varying pulse widths is replaced by adding an additional bit to select between short and long pulses.

Printing gray-scale images is accomplished in yet another embodiment that comprises an SLM array rotated 45 degrees from the typical orthogonal or aligned position where the image from the SLM is projected onto an Organic PhotoConductor drum internal to an electrophotographic printer. By rotating the SLM array and moving the drum in increments of less than the length of a projected pixel, the resolution is enhanced. For example, the print material associated with the drum may be moved a length corresponding to ½ the diagonal length of a projected pixel to double the image resolution. Degrees of gray are also enhanced by the cumulative exposure that can be utilized since multiple rows are projected onto the drum simultaneously.

Yet another embodiment is presented in which an SLM array is rotated 45 degrees from the typical orthogonal position and the SLM array is displaced by the distance of ½ of a projected diagonal pixel to increase the resulting image resolution on the display screen. By properly synchronizing the image planes with the dynamic displacement of the SLM, the changing image location on the display screen results in additional addressable picture element locations. Enhanced resolution is the primary advantage, which reduces the visible artifacts.

In other embodiments, linear actuators such as voice coils or piezo electric devices are used to dynamically displace a mirror assembly in the optical path. The actuators allow for image displacement along a single axis or multiple axes and can increase the picture element light coverage in the gap area between picture elements and can smooth coverage in other discontinuances. This embodiment has the further advantage of providing exceptional control over the amount of image displacement, and can be used not only to increase image resolution by using a single SLM pixel to expose at least two pixels in the projected image, but can also be used for dithering in order to reduce artifacts.

Additional embodiments include displacing one or more optical elements in the projection system to displace the projected image. The displacement of the optical elements may be accomplished via any number of techniques. Optical elements include but are not limited to mirrors, lenses, and plane-parallel plates. It may also be possible to displace the projected image through non-mechanical means, such as by reshaping an optical element or by varying its refractive index. The resulting movement of the projection may be lateral, circular, or elliptical, or it may be more complex, according to the pixel displacement and/or dithering needs.

BRIEF DESCRIPTION OF THE DRAWINGS

Reference is now made to the following detailed description of the described embodiments, taken in conjunction with the accompanying drawings. It is emphasized that various features may not be drawn to scale. In fact, the dimensions of various features may be arbitrarily increased or reduced for clarity of discussion. In addition, it is emphasized that some components may not be illustrated for clarity of discussion. Reference is now made to the following descriptions taken in conjunction with the accompanying drawings, in which:

FIG. 7 illustrates a pair of micro-mirrors of a DMD device;

FIG. 8 illustrates the two micro-mirrors of FIG. 7 in a tilted position;

FIG. 9 illustrates a tilted mirror mounted to a motor shaft;

DETAILED DESCRIPTION

As discussed previously, an SLM device comprises an array of fixed picture elements that form an image, which may be projected onto print material or projected onto a display plane. While SLM technologies differ in the methods in which light is presented to form the display image, they all have separate picture elements, which are normally arranged in an orthogonal pattern. Increasing the size of a projected image causes artifacts to become larger and more pronounced which can result in a distraction to the viewer. As display technology has progressed, higher resolution imaging devices have reduced the effect of artifacts with the trade-off in higher system cost. Although the higher resolution display systems may reduce the artifact effects when compared to a similar sized projected image, a higher resolution display will show the artifacts as the projected image is increased in size. Images that are printed need high resolution because artifacts are easily perceived on a static image.

The proposed systems and methods in this description will use DMD-based systems as exemplary embodiments, but the the systems and methods described can be applied to other types of display systems using individual picture elements.

Figure 1:
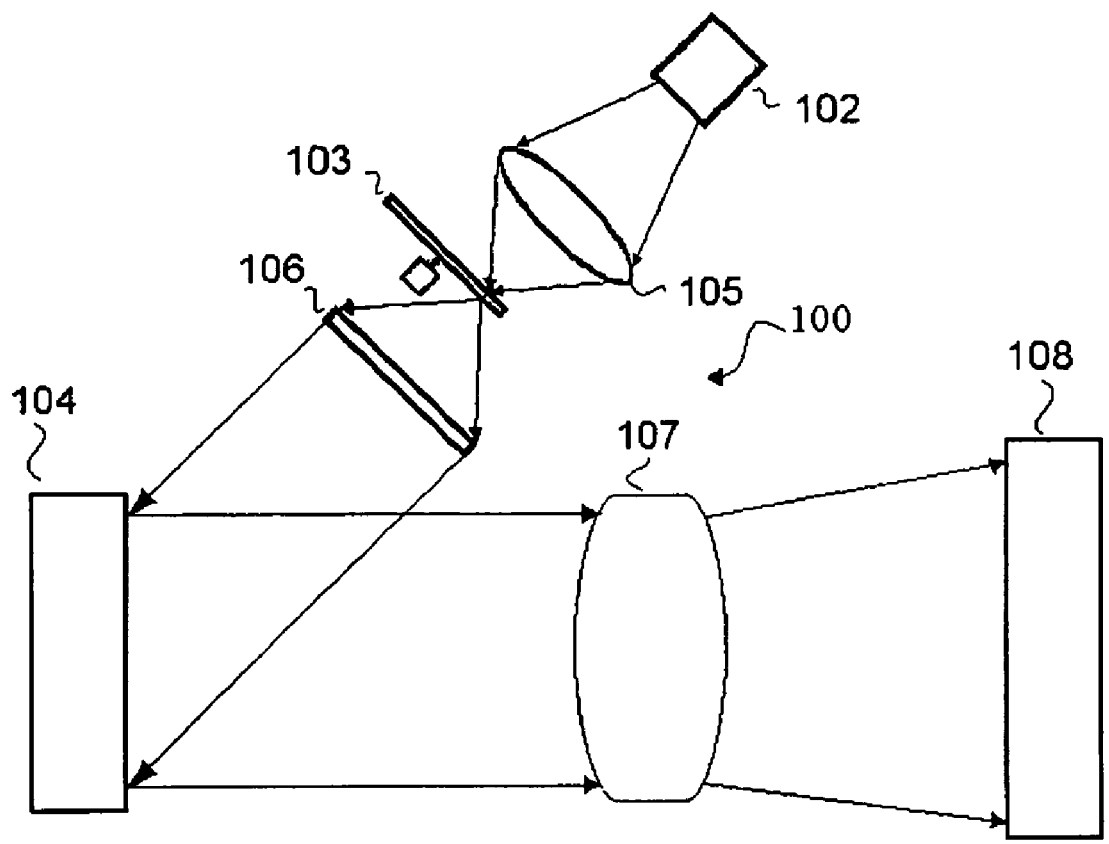
FIG. 1 illustrates one embodiment of a digital printing system for use with print material, which uses an SLM having a DMD therein to generate image data from an input signal.

FIG. 1 illustrates a printing system 100 that uses a DMD device 104 to project an image onto a photosensitive or print material. A light source 102 is projected through a color wheel 103 by the use of lens 105. Lens 106 collimates the light from the color wheel and applies the light onto DMD 104, where the image is formed by electrical signals applied to the selective picture elements. A projection lens system 107 then projects the image onto the print material surface 108. An increase in the resolution is accomplished by orienting the DMD device such that the projected pixels of the resulting image are oriented at 45 degrees relative to the x and y axes of the print material 108. The individual pixels are accordingly presented to the print material as a diamond shape (see, e.g., FIG. 3). By moving the print material by a distance of less than a length of one of the projected pixels, in either the horizontal (x) or vertical (y) direction followed by exposing the material in at least two exposure phases, the image resolution can effectively be increased. In some embodiments, the print material may be moved a distance corresponding to ½ the diagonal length of at least one of the projected pixels, to effectively double the image resolution. The print material can be linearly moved in either of the horizontal (x) or vertical (y) direction in a variety of manners, including via a linear actuator. The actuator can be used to translate the image on the print material in a direction transverse to the progression of the print material in the printer. Additionally, the array can be scanned onto the print surface as it progresses through the printer to provide an infinite number of possible effective pixels in the scanning direction.

Figure 2:
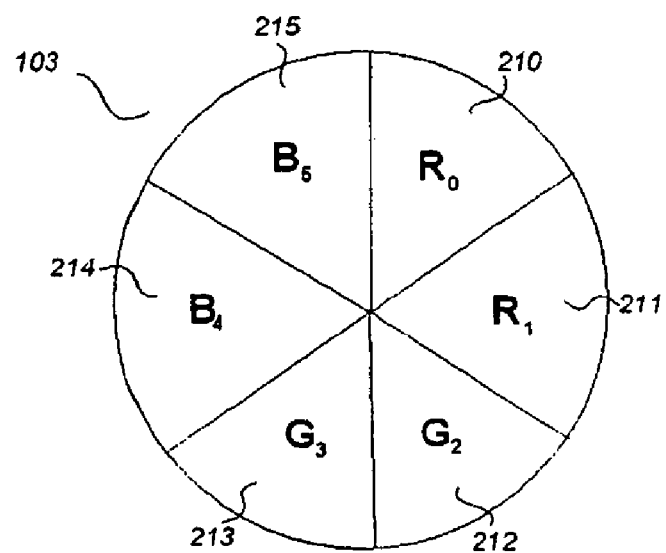
FIG. 2 illustrates a color wheel consisting of three primary colors for use in a digital printing system.
Figure 3:
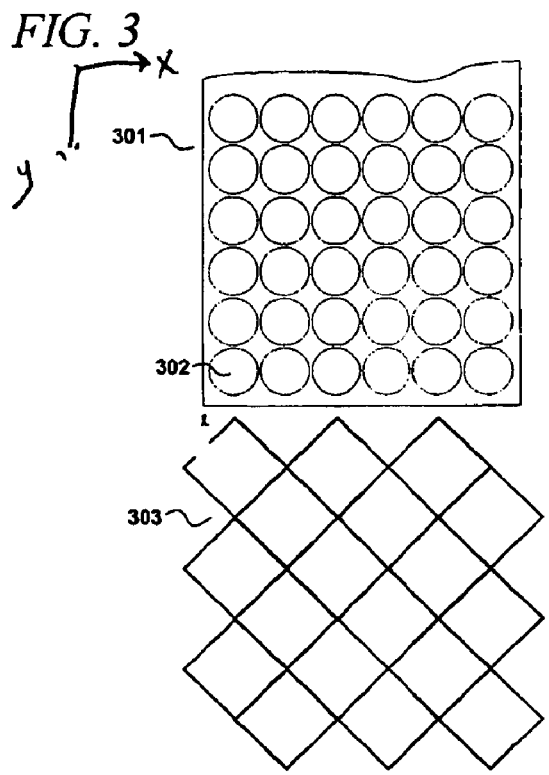
FIG. 3 illustrates a portion of print material including pixel locations aligned for progressive exposure from a portion of an SLM array rotated 45 degrees from a typical orthogonal pattern.

FIG. 2 illustrates 6 exposure regions on a color wheel 103, which corresponds to exposure phases. For this embodiment, the color wheel 103 is utilized to provide primary colors to the print material for the production of color images. The first red region 210 is denoted by $R_0$ and corresponds to the first phase in the exposure sequence, phase 0. $R_0$ is followed by regions 211, 212, 213, 214 and 215 corresponding to $R_1$, $G_2$, $G_3$, $B_4$, and $B_5$ respectively. FIG. 3 illustrates a section 303 of a DMD array 104 that has been rotated such that its individual pixels project to be oriented at a 45-degree rotation relative to the x and y axes of the print material orientation as shown. The illustrated DMD section 303 includes 18 mirrors that are capable of exposing twice as many pixels on the print material 301 when the material is stepped in increments of, for example, ½ the projected pixel. A pixel location 302 on the print material 301 is shown for reference.

Figure 4A:
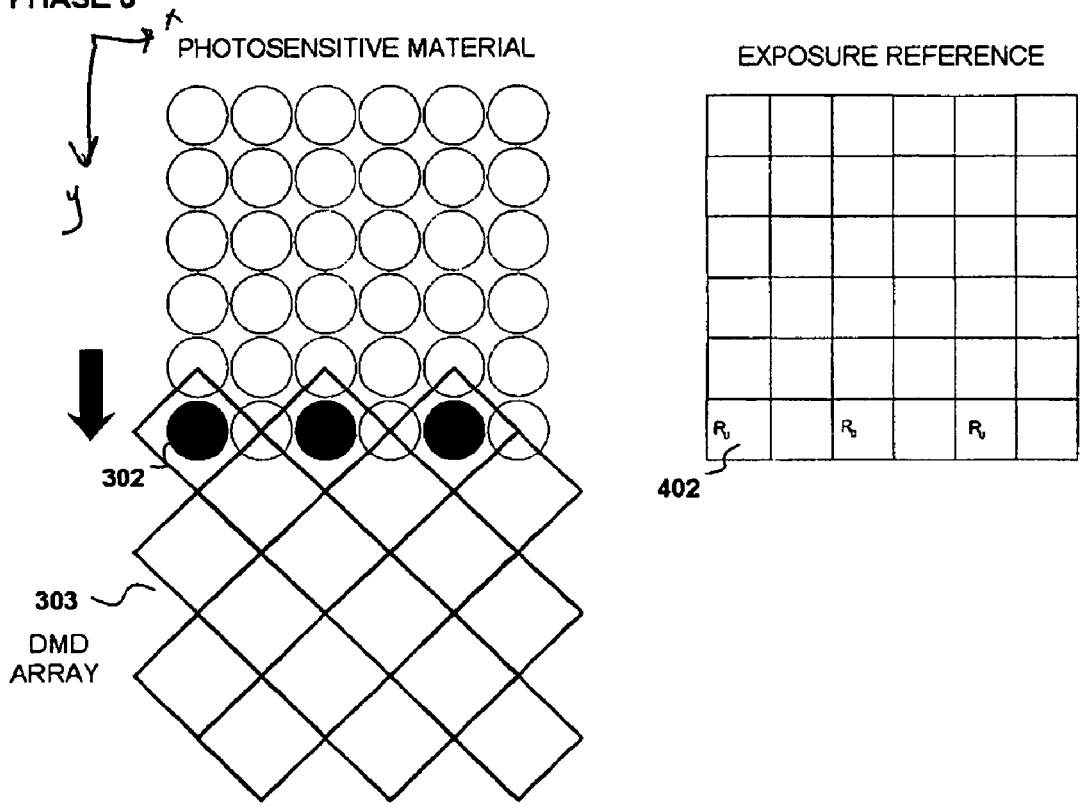
FIGS. 4a-k illustrates the progressive alignment and cumulative exposure of the portion of print material of FIG. 3 as rendered by the SLM array.
Figure 4B:
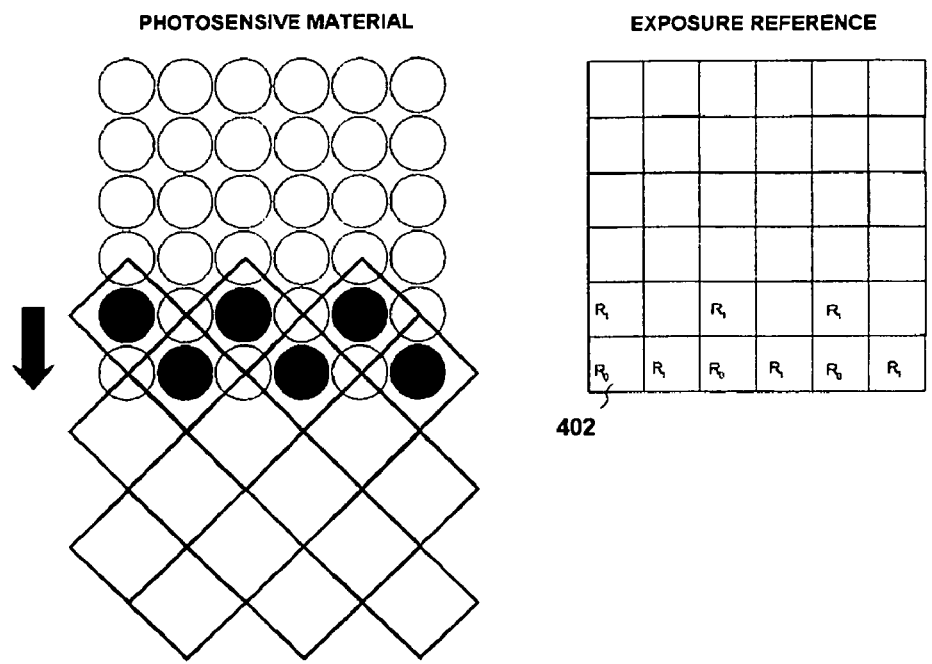
Figure 4C:
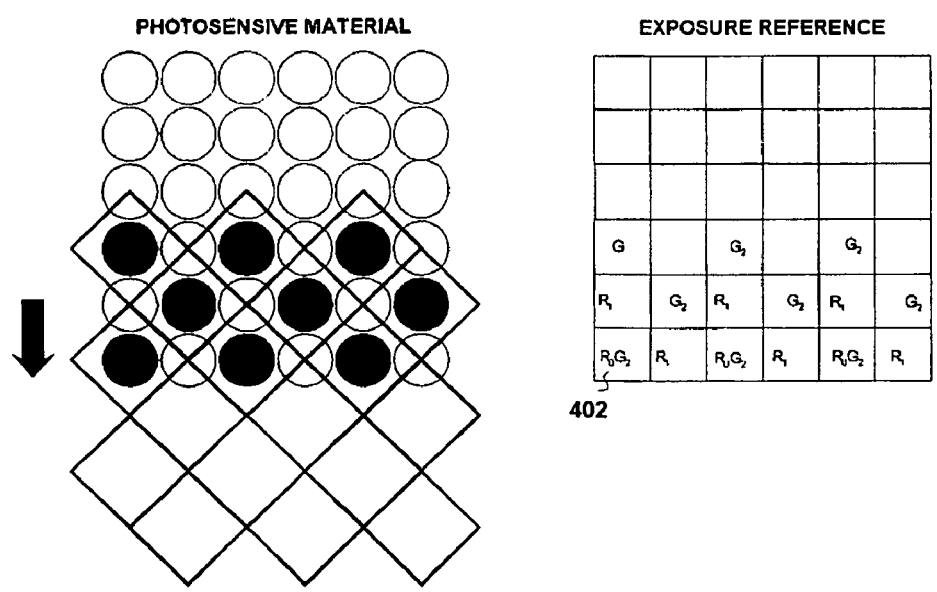
Figure 4D:
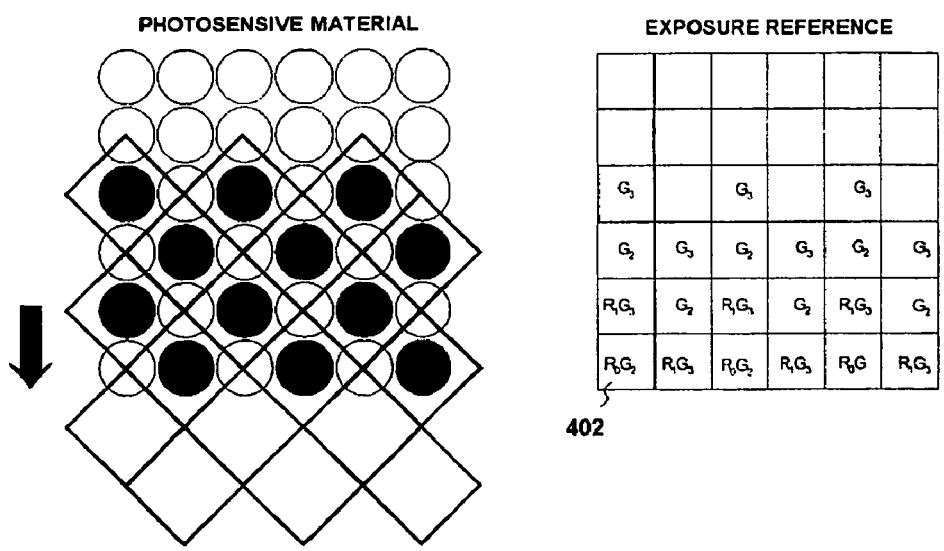
Figure 4E:
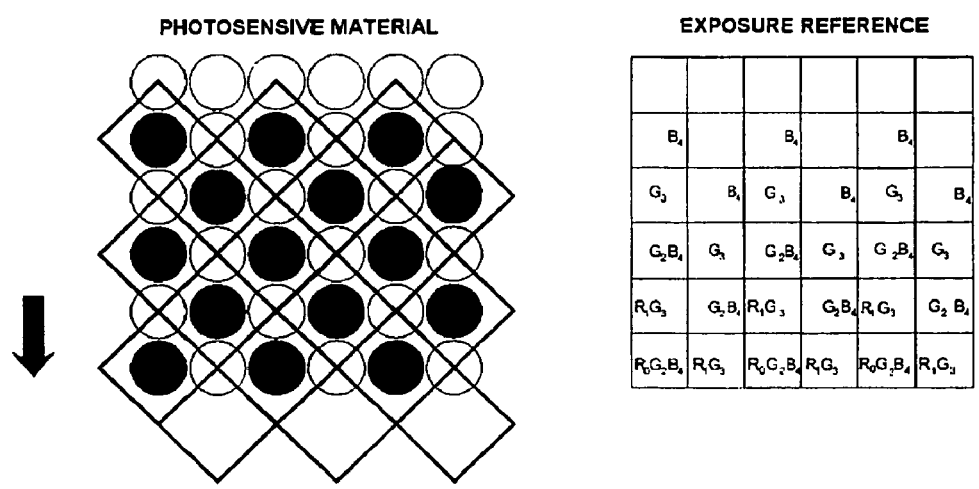
Figure 4F:
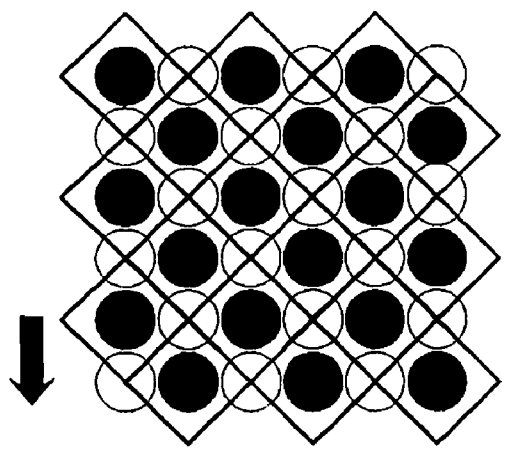
Figure 4G:
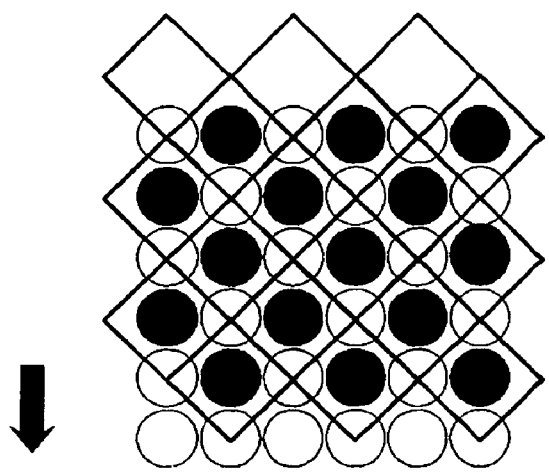
Figure 4H:
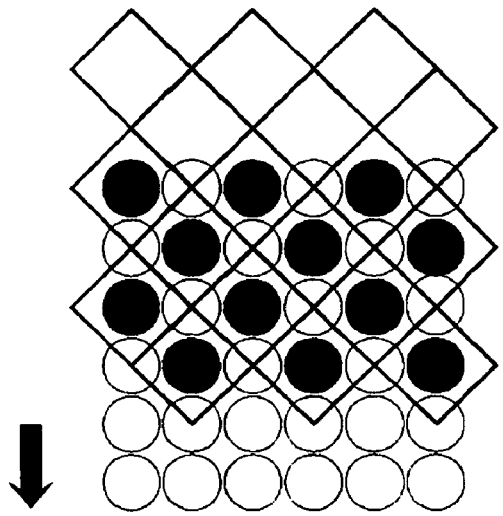
Figure 4I:
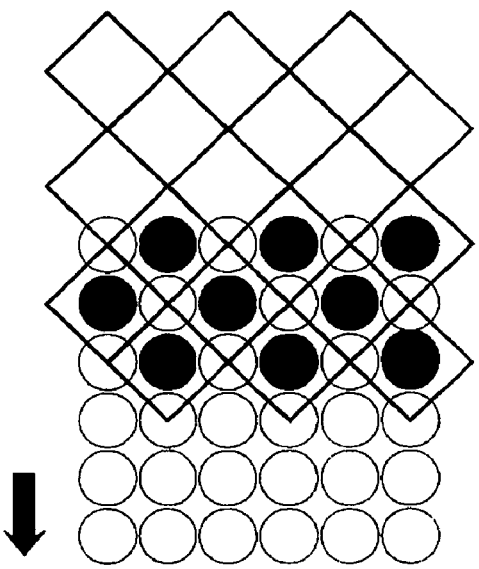
Figure 4J:
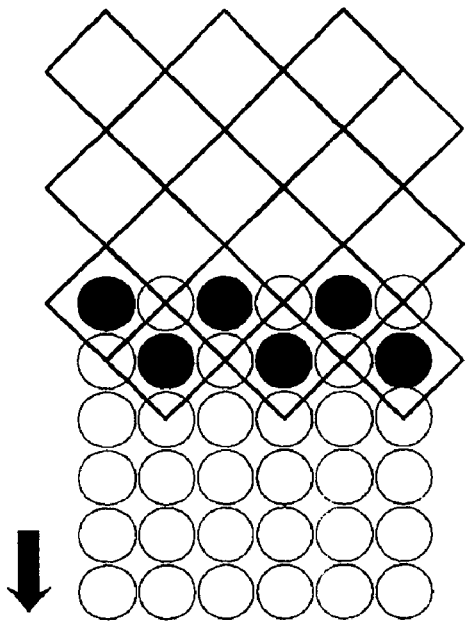
Figure 4K:
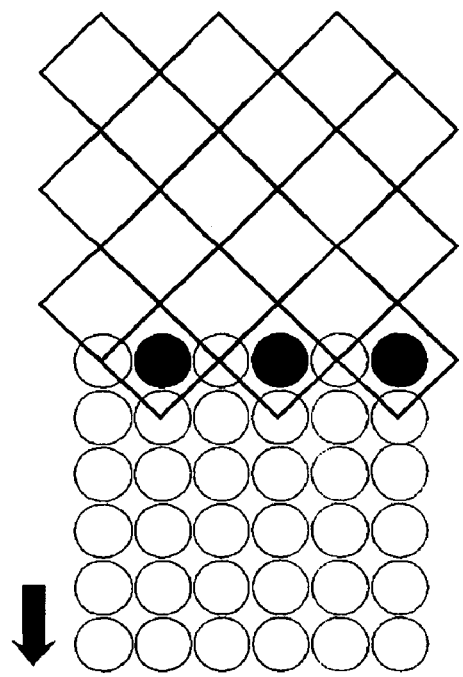

The input image is sampled at every other picture element in phase 0, exposing the corresponding area (pixels) on the print material. FIG. 4a illustrates the first exposure sequence as the pixel 302 and every other pixel afterwards on the row is in a position to be exposed. The appropriate mirrors on the DMD are moved to an ON and then to an OFF position to create a light pulse at the time the color wheel is located at the position for phase 0 corresponding to red, R0. An exposure reference, shown to the right, illustrates the cumulative exposure to the print material. The first cell 402 in the exposure reference is representative of the cumulative exposure to the first pixel location 302. FIG. 4b illustrates the material advanced to the next location where the proper picture elements are activated to expose the phase 1 areas. For the exposure in phase 1, the color wheel is progressed to the $R_1$ section of the wheel and the mirrors are again pulsed. FIG. 4c illustrates the third exposure sequence where green, $G_2$, is the active position of the color wheel. As the mirrors are pulsed, pixel 302 accumulates the green exposure and the cumulative colors are shown in the exposure reference cell 402. FIG. 4d illustrates phase 3 corresponding to $G_3$ and FIG. 4e and FIG. 4f illustrate the blue exposure sequences, phases 4 and 5 respectively. The reference pixel 302 has been exposed to the three primary colors as shown in the exposure reference cell 402. In the next exposure sequence, the row that contains pixel 302 moves from the active exposure area. The color wheel has also made a complete revolution and is ready to restart phase 0 corresponding to the color $R_0$. Exposure sequence 7 is illustrated in FIG. 4g where the appropriate mirrors are once again pulsed to expose red to the proper pixels that are aligned with the array. Exposure sequences 8, 9, 10 and 11 are illustrated in FIG. 4h, FIG. 4i, FIG. 4j, and FIG. 4k respectively. The final and $12^{th}$ sequence moves the print material from the exposure section of the SLM array 303. In this simplified approach, any number of methods may be incorporated to provide a proper exposure level. Such methods may include Pulse Width Modulation (PWM). Additionally, the cumulative exposure method lends itself to high-speed printing, especially on continuous media such as film.

In another embodiment, a system of the first embodiment is used with an exposure algorithm not using PWM to generate varying shades of gray or colors. As described below, desired color images can be produced by using the same three primary colors and 12 exposure phases of the first embodiment.

Table 1 below shows a two-bit exposure algorithm example for providing exposure data. Two bits correspond to pixel values and the exposure phases 0 though 12 are represented with four phases in each of three colors. Color wheel 103 would be further divided to have 12 regions consisting of 4 regions for each color.

| | Exposure Phases | | | | | | | | | | | |
|---|---|---|---|---|---|---|---|---|---|---|---|---|
| | Red | | Green | | Blue | | | | | | | |
| | Pulse Type | | | | | | | | | | | |
| | Short | Long | | Short | Long | | Short | Long | | | | |
| Pixel Values | 0 | 1 | 2 | 3 | 4 | 5 | 6 | 7 | 8 | 9 | 10 | 11 |
| 0 | 0 | 0 | 0 | 0 | 0 | 0 | 0 | 0 | 0 | 0 | 0 | 0 |
| 1 | 0 | 0 | 1 | 1 | 0 | 0 | 1 | 1 | 0 | 0 | 1 | 1 |
| 2 | 1 | 1 | 0 | 0 | 1 | 1 | 0 | 0 | 1 | 1 | 0 | 0 |
| 3 | 1 | 1 | 1 | 1 | 1 | 1 | 1 | 1 | 1 | 1 | 1 | 1 |

To control the exposure level in this embodiment, two pulse durations are provided to expose the print material. Phases 0, 1, 4, 5, 8 and 9 are short pulses, while phases 2, 3, 6, 7, 10 and 11 are long pulses that create additional exposure intensity. An exposure sequence similar to first embodiment may be used where the print material is moved and synchronized with the position of the color wheel. In some contexts, this second embodiment may be less complex than the first.

Figure 5:
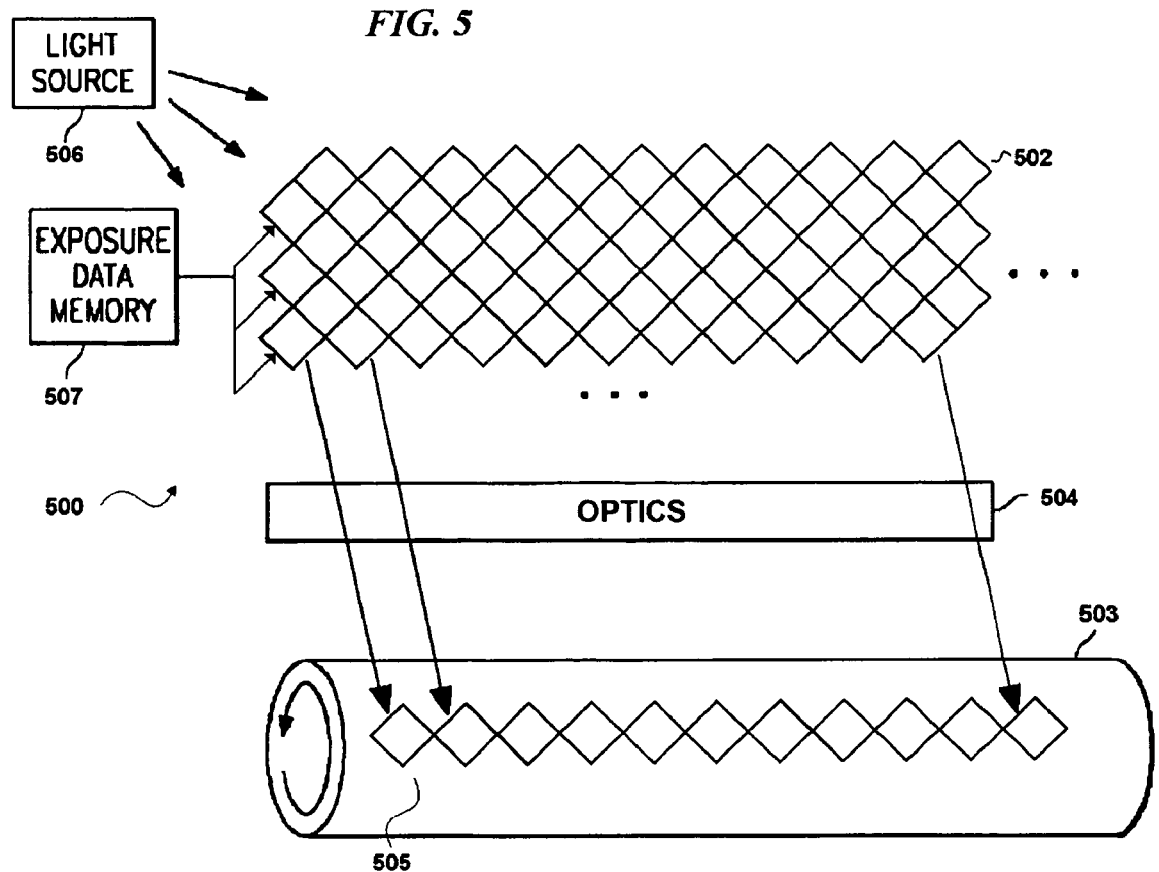
FIG. 5 illustrates the exposure portion of a electrophotographic printing system using an SLM array rotated 45 degrees from a typical orthogonal pattern.

FIG. 5 illustrates another embodiment in which the diamond-shaped pixels are projected onto an Organic Photo-Conductor (OPC) drum of an electrophotographic printer or copier. The figure thus generally illustrates an electrophotographic system 500 using a DMD array 502 that is oriented such that its projected pixels are rotated 45 degrees relative to the x and y axes of a resulting image. For the purpose of providing a simple example, only a portion of the DMD array consisting of 3 rows by 11 columns is illustrated. A typical DMD array 502 might have 1000 or more mirrors per row and although the illustration only shows one row projected onto the OPC drum, multiple rows may be activated and projected to the drum at the same time. As the OPC drum 503 rotates, image data is transferred from the exposure data memory 507 to the DMD array 502 in accordance with the desired "ON" or "OFF" state of the selective mirror elements. The drum 503 may be rotated in a variety of manners, including via a rotational actuator (not shown). A light source 506 is reflected from the selective mirror elements and projected by optics 504 onto the photosensitive area 505 of the OPC drum 503. By rotating the OPC drum 503 a distance of less than a diagonal length of at least one of the projected pixels, the horizontal resolution can be enhanced and the resolution in the drum rotation direction is also enhanced. In some embodiments, the OPC drum may be moved a distance corresponding to ½ the diagonal length of at least one of the projected pixels to effectively double the image resolution. The resolution in the drum rotation direction is only limited by the resolution of the steps and exposure time desired. The gray scale may be improved by using accumulative exposure onto the drum. The cumulative exposure as described in U.S. Pat. No. 5,721,622, entitled "Grayscale Printing with Spatial Light Modulator and Sliding Window Memory," which is hereby incorporated by reference herein. Other exposure techniques such as PWM may be used in accordance with data delivery to obtain exposure levels. U.S. Pat. No. 5,461,411, entitled "Process and Architecture for Digital Micromirror Printer," which is hereby incorporated by reference herein, describes additional methods for generating gray scales.

Cumulative exposure sequences in the embodiment presented here correspond to shades of gray and each exposure would decrease the charge in a system where the OPC drum is positively charged. Once the drum is charged, the print material, which is also charged, passes over the drum and attracts the toner material onto the imaging material. As the print material leaves the drum, the toner is typically fused to the print material by heat. An SLM printer using this method has the advantage of higher resolution as a result of the effective doubling (for example) of exposure areas. Having multiple rows available in conjunction with the cumulative exposure method, the printer would be capable of operating at high speeds because an entire row is exposed at a single time in comparison to scanning across a row.

Figure 6:
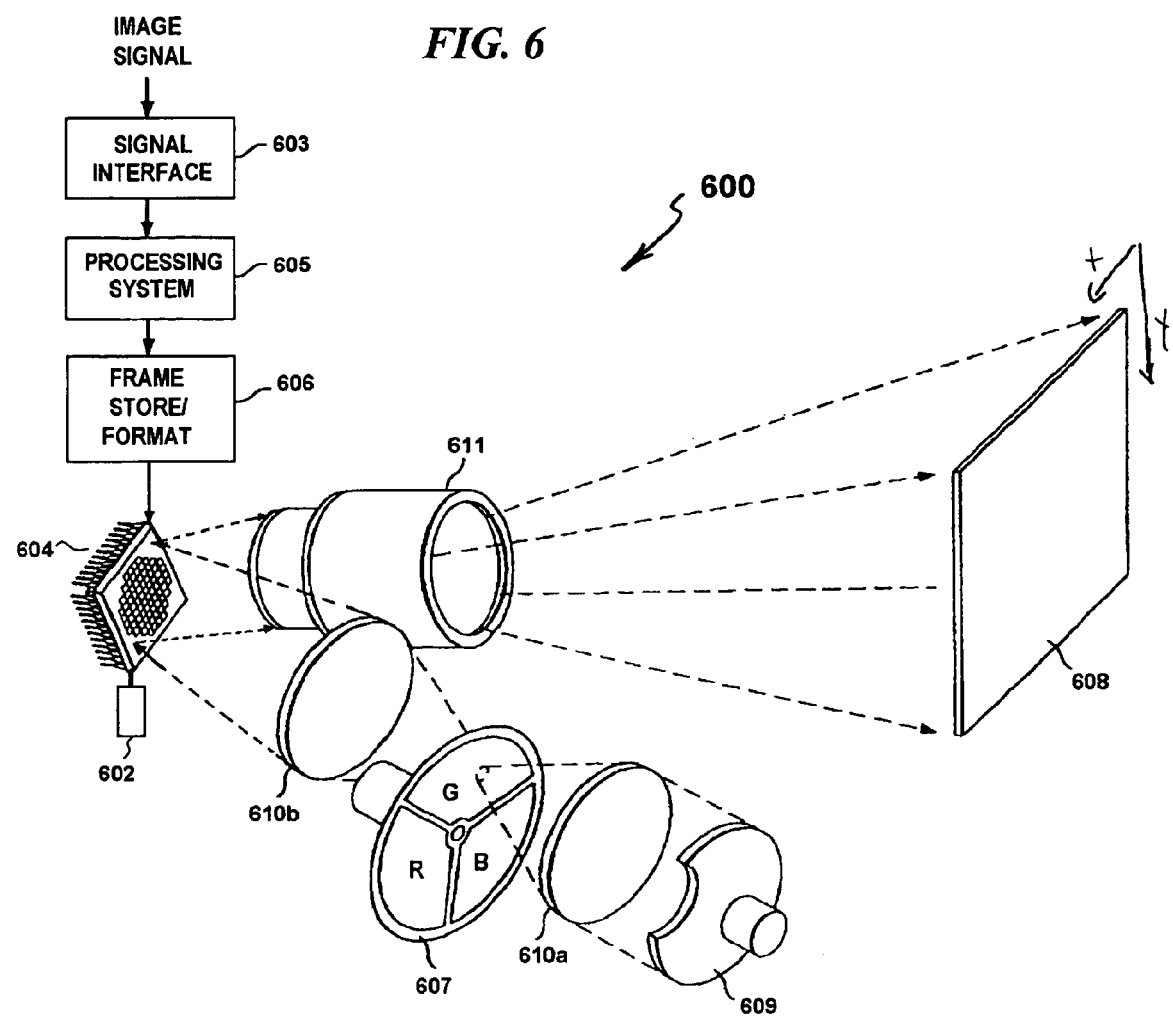
FIG. 6 illustrates a display system using an SLM array rotated 45 degrees from a typical orthogonal pattern where the SLM array may be dynamically repositioned.

FIG. 6 illustrates an embodiment using a DMD array 604 whose projection is tilted at 45 degrees relative to the x and y axes of the display plane 608. The illustrated projection display system 600, using DMD 604 therein, may be used to generate moving or static images. A linear displacement device 602 may also be used to displace the DMD device or another optical element in the optical path between the DMD device 604 and the display plane 608 such that the projected image relative to the display plane 608 is displaced by a distance of less than a diagonal length of one of the pixels projected onto the display plane for the purpose of providing additional addressable pixel locations on the display plane 608. In some embodiments, the displacement may correspond to ½ of the diagonal length of a projected pixel. For the purpose of providing a simple example, only the functions significant to increasing the resolution are shown in FIG. 6.

A comprehensive description of a DMD-based digital display system is set out in U.S. Pat. No. 5,079,544, entitled "Standard Independent Digitized Video System," and in U.S. Pat. No. 5,526,051, entitled "Digital Television System," and in U.S. Pat. No. 5,452,024, entitled "DMD Display System." Each of these patents is assigned to Texas Instruments Inc. and each is incorporated by reference herein.

The input image signal feed into the signal interface 603 may be from a television tuner, MPEG decoder, video disc player, video cassette player, PC graphics card, or the like. In fact, an analog signal may also be the initial image signal, in which case the signal interface 603 would also contain an analog-to-digital converter to convert the incoming image signal to a digital data signal. Processing system 605 prepares the data for display by performing various pixel data processing tasks. Processing system 605 may include whatever processing components and memory are useful for various corrections and conversion. Once the processing system 605 is finished with the data, a display memory module 606 receives processed pixel data from the processing system 605. The display memory module 606 formats the data, on input or on output, into bit-plane format, and delivers the bit-planes to the DMD 604. It is understood that the signal interface 603, the processing system 605, and the display memory module 606 may be collectively referred to as the image input apparatus. Of course, the image input apparatus is not limited to the aforementioned devices and systems, but may be any device and/or system that operates to provide image data to the DMD 604. The bit-plane format permits single or multiple pixels on the DMD 604 to be turned ON or OFF in response to the value of one bit of data, in order to generate one layer of the final display image. Although not shown, a sequence controller associated with the display memory module 606 and the DMD 604 may be used for providing reset control signals to the DMD 604, as well as load control signals to the display memory module 606.

Although this description is in terms of an SLM having a DMD 604 (as illustrated), other types of SLMs could be substituted into display system 600. Details of a suitable SLM are set out in commonly owned U.S. Pat. No. 4,956,619, entitled "Spatial Light Modulator," which is hereby incorporated herein by reference herein. In the case of the illustrated DMD-type SLM, each piece of the final image is generated by one or more pixels of the DMD 604, as described above. The SLM uses the data from the display memory module 606 to address each pixel on the DMD 604. The "ON" or "OFF" state of each pixel forms a black or white piece of the final image, and an array of pixels on the DMD 604 is used to generate an entire image frame. Each pixel displays data from each bit-plane for a duration proportional to each bit's PWM weighting, which is proportional to the length of time each pixel is ON, and thus its intensity in displaying the image. In the illustrated embodiment, each pixel of DMD 604 has an associated memory cell to store its instruction bit from a particular bit-plane.

For each frame of the image to be displayed in color, Red, Green, Blue (RGB) data may be provided to the DMD 604 one color at a time, such that each frame of data is divided into red, blue, and green data segments. Typically, the display time for each segment is synchronized to an optical filter, such as a color wheel 607, which rotates so that the DMD 604 displays the data for each color through the color wheel 607 at the proper time. Thus, the data channels for each color are time-multiplexed so that each frame has sequential data for the different colors.

For a sequential color system, such as the system 600 illustrated in FIG. 6, a light source 609 provides white light through a condenser lens 610a, which focuses the light to a point on the rotating color wheel 607. A second lens 610b may be employed to fit the colored light output from the color wheel 607 to the size of the pixel array on the DMD 604. Reflected light from the DMD 604 is then transmitted to a display lens 611. The display lens 611 typically includes optical components for illuminating an image plane, such as a display screen 608.

In an alternative embodiment, the bit-planes for different colors could be concurrently displayed using multiple SLMs, one for each color component. The multiple color displays may then be combined to create the final display image. Of course, a system or method employing the principles disclosed herein is not limited to either embodiment.

A cross section of a DMD device is illustrated in FIG. 7 showing a mirror 702 and a gap 705. In the illustrated cross section, individual mirrors are supported by a post 703 and rotate about a base 704. There are alternate embodiments for DMD devices; however, each embodiment has a similar characteristic gap between mirror elements, as do LCD-type SLM devices. FIG. 8 illustrates why a sufficient gap is needed between two mirror elements, as without that gap, as shown in the figure, the adjacent mirrors can interfere with each other. Other types of SLM devices may utilize the gap area, for example, for routing a control signal to the picture elements.

The individual picture element could be expanded by slightly defocusing the image, which blends the picture elements together but results in a lower quality image. Each individual picture element is the lowest quantum of the image and in essence represents a level of luminance and a color. A desired approach is to expand the individual projected picture element to fill the gap between them while maintaining a quality image.

FIG. 9 illustrates an embodiment in which a mirror is attached to the shaft of a motor so that the mirror rotates within the projection path at an angle relative to the perpendicular axis of the motor shaft. The figure illustrates the rotating mirror assembly 900 where a motor 905 has a mirror 902 attached to the motor shaft. Line 904 shows the perpendicular axis to the mirror plane, which is tilted at an angle Θ 903 relative to a perpendicular line 906 to the motor shaft. As the motor shaft to which the mirror is attached rotates, the mirror is angularly displaced by −Θ to +Θ.

Figure 10:
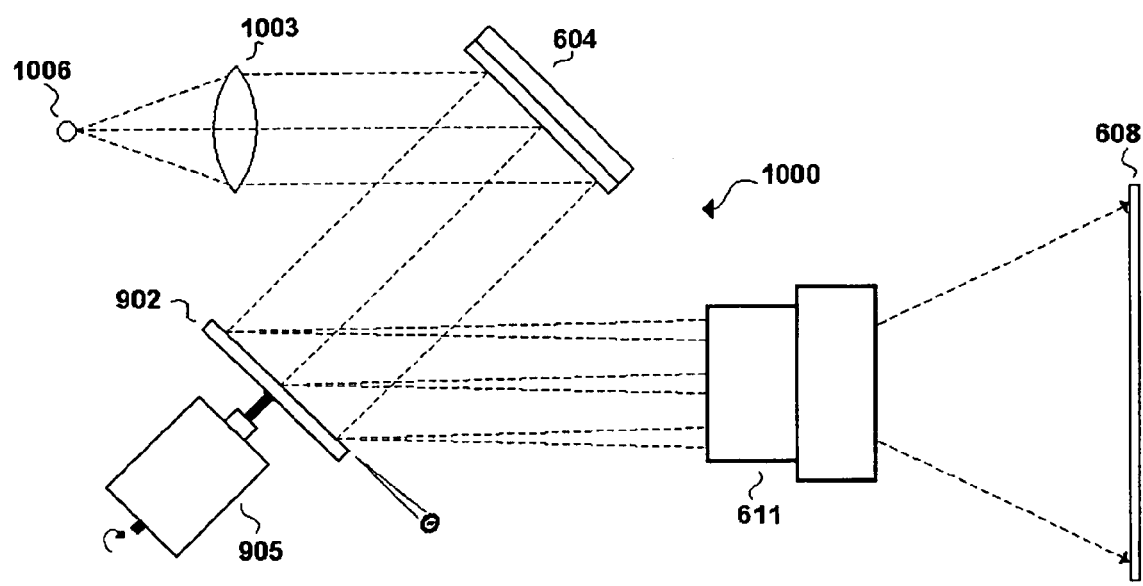
FIG. 10 illustrates an optical path utilizing a tilted mirror mounted to a motor shaft.

FIG. 10 illustrates a basic light beam path through an optical system 1000. The illustrations of the light path are intended to present a simplified view of the projection system in order to illustrate the embodiment presented here and in practical designs; there are typically additional lenses, filters and other components. A conventional optical path is designed so that the light passes through the lens system in straight lines to minimize distortions. In the system illustrated in FIG. 10, light is emitted from the light source 1006, and the light is collimated by converging lens 1003 so as to distribute onto the DMD device 604. An image is formed on the DMD device and light is selectively reflected from the DMD device onto the mirror 902. Mirror 902 is attached to the motor 905 at an angle Θ relative to a perpendicular line to the motor shaft. As the mirror 902 rotates, the angle of the mirror changes from −Θ+Θ, and given that the law of reflection states that the angle of incidence equals the angle of reflection, the light beam leaving the mirror also varies from −Θ+Θ. When the optical path deviates from a path perpendicular to the lens plane, also known as the normal to the lens plane, the resulting image may be slightly irregular and could become noticeable to a viewer if the angle is too large.

Figure 11:
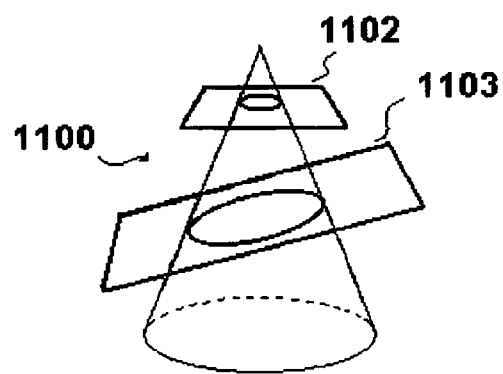
FIG. 11 illustrates a conic projection resulting from a tilted display plane.

FIG. 11 illustrates the effect of changing an angle anywhere in the optical plane including the final projection plane. From FIG. 11, it is illustrated from the principle of conic sections that a change from a plane intersecting a right circular cone other than perpendicular to the axis of the cone will result in the image being stretched along one axis as in a circle transforming into an ellipse. As illustrated in FIG. 11, a plane 1102 intersecting the cone at a perpendicular line produces a circle, while a plane 1103 intersecting at a tilted angle would produce an ellipse or other conic if the angle is greater. Additionally, the projection from the rotating mirror 902 is varying from −Θ to +Θ, and the projected light traces a conic shape. At the point where the light falls on the projection lens, the image will be rotating about the outside perimeter of the conic that is formed. The image that appears on the display plane 608 will also be dynamic and rotate about the path of a conic on the display plane. Such a path is illustrated in FIG. 12 showing variations in picture element positions.

Figure 12:
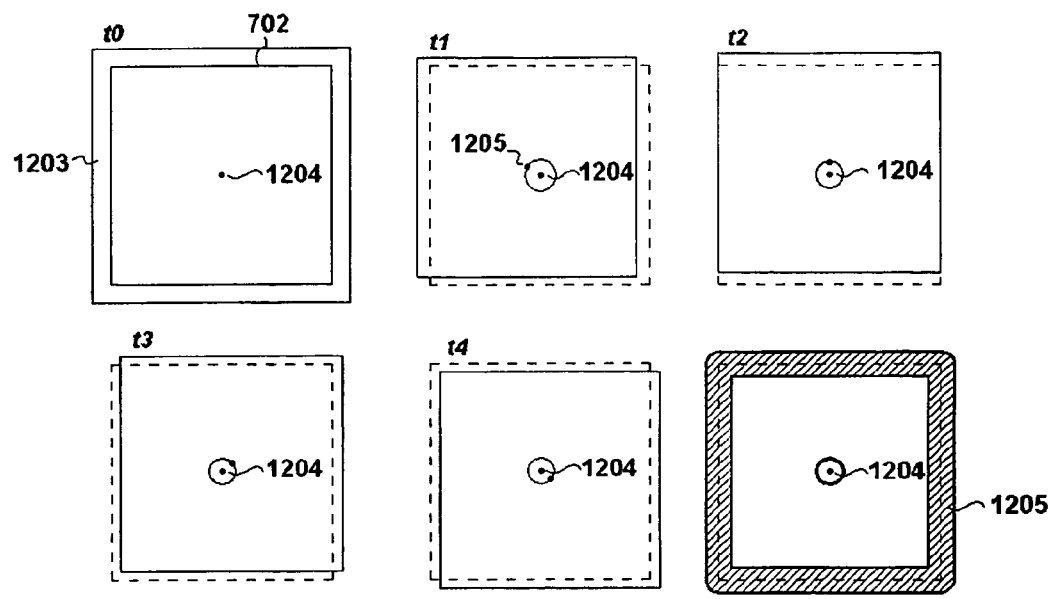
FIG. 12 illustrates a picture element movement in a dynamic optical path.

For a small mirror gap, the rotating mirror angle Θ would typically be small and for illustrative purposes, FIG. 12 indicates a circular path and does not show any distortions. Prior to any offsets in the optical path, the FIG. 12 illustration t0 represents an individual picture element for a DMD device 702 at a first ("t0") instant in time, the corresponding gap between picture elements is indicated by 1203, and 1204 indicates the center of the picture element. When the rotating mirror is placed in the optical path and offset by angle Θ, the entire image along with each picture element is now offset-correlated to the motor shaft position. A new position, t1, is shown where the picture element has a new center 1205 that will rotate about the point 1204 corresponding to the time t0, when no offset was present. As the motor shaft rotates by approximately ⅛ turn, or 45 degrees, the picture element moves to a position t1. Positions t2 and t3 are illustrated for further increments of approximately 45-degree rotations respectively of the motor shaft. As the motor shaft rotates and the mirror moves from −Θ to +Θ, the picture elements will sweep an area larger than a corresponding area for a static picture element. An obvious advantage is that the dynamic picture elements are able to direct light into the gap area making the gap less noticeable while maintaining image clarity. Additionally, since a control can be achieved over the location of a dynamic image placement, more addressable spaces can be realized. Time slices for the SLM system may be measured in bit times, which as discussed previously, represent the shortest time for which an individual bit plane is available for display. Synchronizing the picture element position with the SLM can also be used to increase the number of locations that individual bit planes can display.

Figure 13:
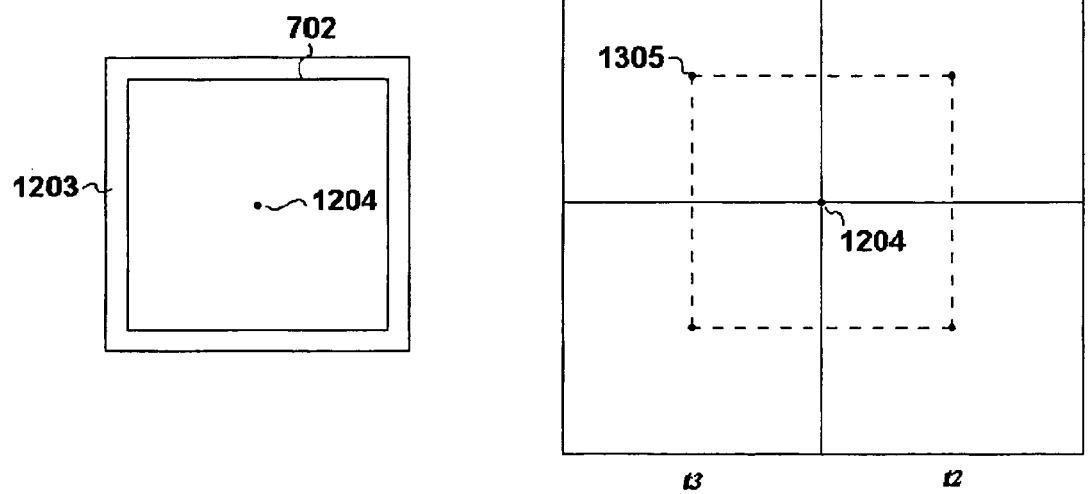
FIG. 13 illustrates a picture element movement in a manner that increases the perceived resolution of a display system.

FIG. 13 illustrates how a single picture element 702 with an un-displaced center projection 1204 can be displaced in a manner to be perceived as four picture elements. The first displacement with new center 1305 is at time to, followed by a second location at t1, and a third and fourth at t2 and t3 respectively. By properly synchronizing the bit times of the SLM with the image displacement positions, the viewer will perceive an increase in resolution.

Figure 14:
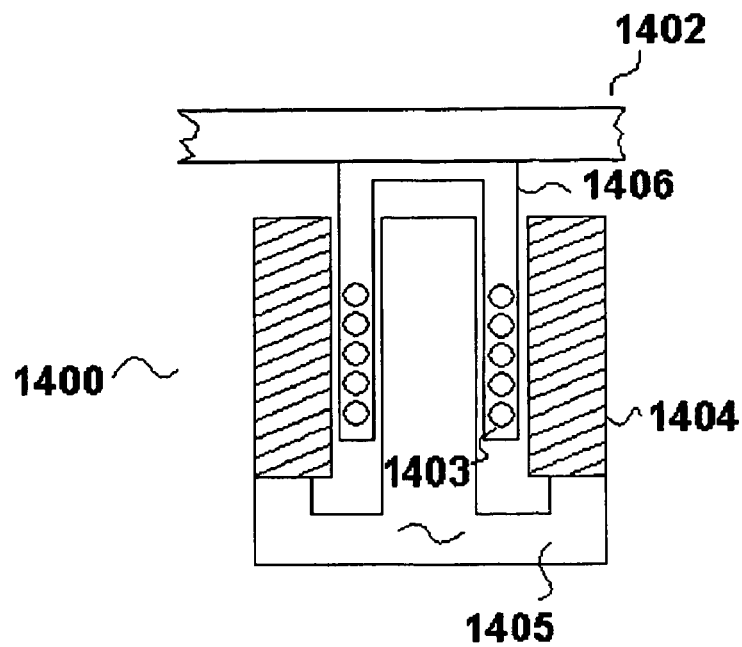
FIG. 14 illustrates a cross-sectional view of a voice coil.

FIG. 14 illustrates another embodiment in which a mirror in the optical path is modulated by a voice coil at two points, where the voice coil motion is imparted at the two points in directions that are generally perpendicular to the mirror plane, providing an image displacement in two axes. As illustrated, a linear actuator 1400 is shown providing a mechanism for displacing a mirror 1402 at one of the two points. In this example, a voice coil is used as a single phase limited motion linear actuator and consists of a tightly wrapped coil of wire 1403 situated near a permanent magnet 1404. The permanent magnet 1404 creates a radially oriented magnetic field and is supported by a ferromagnetic magnet 1405 as the inner structure which also serves to complete the magnetic field radiating through the coil of the moving member 1406 that is attached to the mirror 1402. When a signal is applied to the coil, a magnetic field is generated in proportion to the signal's current, which produces an attraction to or repulsion from the stationary permanent magnet, creating linear motion. The signal may vary from a negative voltage to a positive voltage in varying degrees moving the voice coil in a linear motion closer to and farther from the stationary magnet. A voice coil actuator can be constructed in many different forms and this embodiment shows only one example of the voice coil type. This embodiment can use many different forms of voice coils or other types of linear actuators for the purpose of displacing a component in the optical assembly. Voice coils are an excellent choice because they are accurate with smooth control and do not experience backlash when being positioned. A voice coil is also a practical solution given that they are efficient, fast, compact, low cost, have a long life and a low overall cost.

Figure 15:
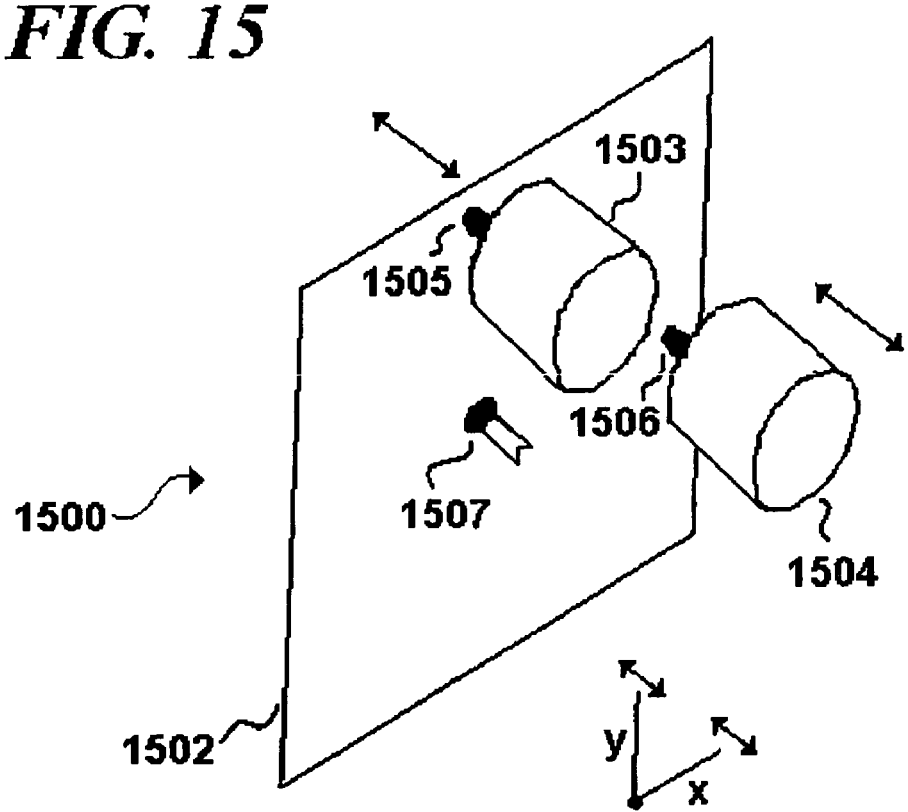
FIG. 15 illustrates a mirror attached to a rotating point and additionally attached by two voice coils.

An example of using linear actuators is illustrated in FIG. 15 where a tilting mirror assembly 1500 uses two voice coils to tilt the mirror at two attachment points 1505, 1506. Mirror 1502 is attached at the center by a flexible joint 1507 that allows the mirror to rotate about the x and y axes. Linear actuators 1503 and 1504 are positioned at points 1505 and 1506 respectively along the backside of the mirror 1502 so that the motion of the linear actuators tilts the mirror 1502 about the flexible joint in varying degrees. Mirror assembly 1500 may be used in the optical system 1000 in lieu of the rotating mirror assembly 900. In the linear system, the mirror can be placed in a wider variety of positions as compared to the rotating mirror. This flexibility allows the angle of displacement to be adjustable, thus allowing for the degree of gap coverage to be modified. Additionally, in a system where the resolution is increased by image displacement, the linear displacement described offers more control over the movement, timing and resting locations.

Figure 16:
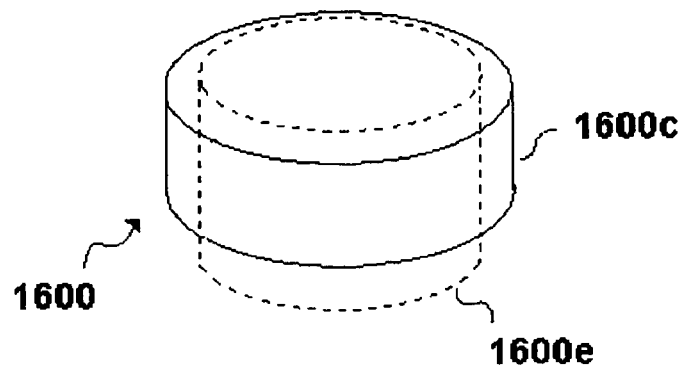
FIG. 16 illustrates a poled piezoelectric ceramic element.

In another embodiment, illustrated in FIG. 16, a mirror in the optical path is modulated by a poled piezoelectric ceramic element or a "piezo device" at two points that also induce motion that is generally perpendicular to the mirror plane. A piezo device can be used as a linear actuator in a similar manner as the voice coils of the previous embodiment. Single piezo devices typically provide linear movement up to about 40 microns. A piezo device 1600 is shown in the figure at a point of contraction 1600c and elongation 1600e. When a voltage of one polarity is applied to the piezo element, the element will lengthen and its diameter will become smaller, thereby shaping the piezo device 1600 to its elongation dimension 1600e. As a voltage of the opposite polarity is applied to the piezo, the element 1600 will become shorter and wider, thereby shaping the piezo device 1600 to its contraction dimension 1600c. At the outer dimensions of the piezo device 1600, linear movement occurs with the elongation and contraction. Attaching a piezo device 1600 in a similar manner as the voice coil of the second embodiment can provide for small mirror movement in various directions, resulting in light being projected in the picture element gaps and reducing the screen-door effect created by such gaps and otherwise providing a dithering effect to the projected image.

Figure 17:
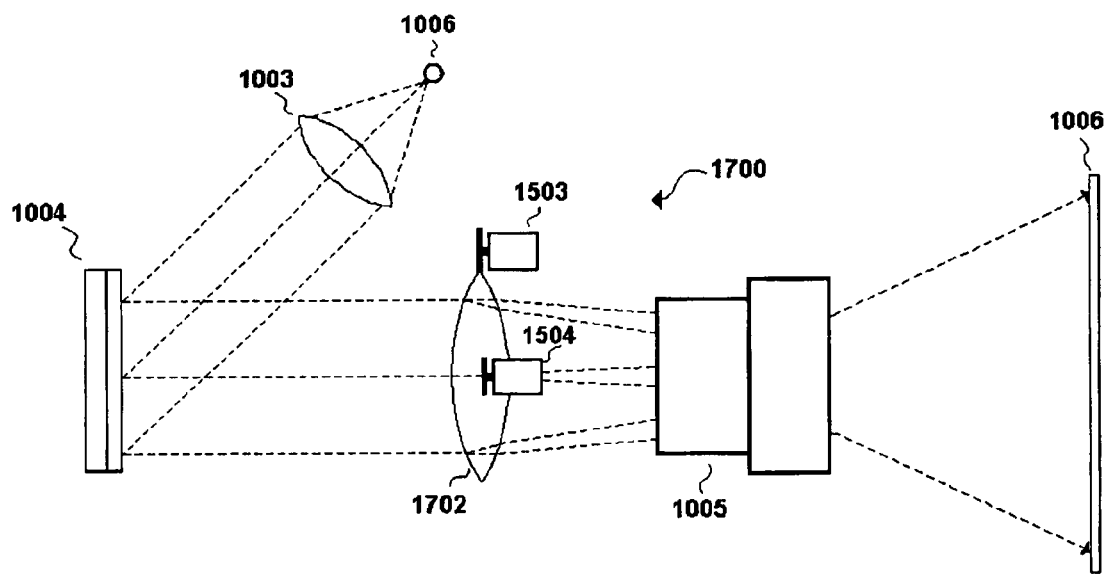
FIG. 17 illustrates a dynamic optical path using a moveable lens system.

In another embodiment illustrated in FIG. 17, a lens in the optical path is modulated by a linear actuator at two points, which move in a direction that is generally perpendicular to the lens center plane, thereby providing an image displacement in two axes. The linear actuators 1503, 1504 could be voice coils, piezoelectric elements or another of the diverse types of linear actuators. The reflected image from the DMD device or other SLM device is projected through the moveable double convex lens 1702 where the light reaches the lens surface and refracts according to the effective angle of incidence. As the lens is moved, the effective angle of incidence varies, resulting in changes to the light refraction thus changing the image position. The double convex lens, having its characteristic curved surface, will refract light rays more at a distance farther from the lens center. Similar dithering effects also may result from translating the points on the lens in directions that are not perpendicular to the center plane of the lens 1702, since this would affect the focusing of the image through the lens. It is also possible to modulate the index of refraction of the lens 1702 or another optical element in order to affect the focusing of the image projected through the lens. These types of image displacement can also be used effectively to increase the optical resolution of or dither the projected images.

Figure 18:
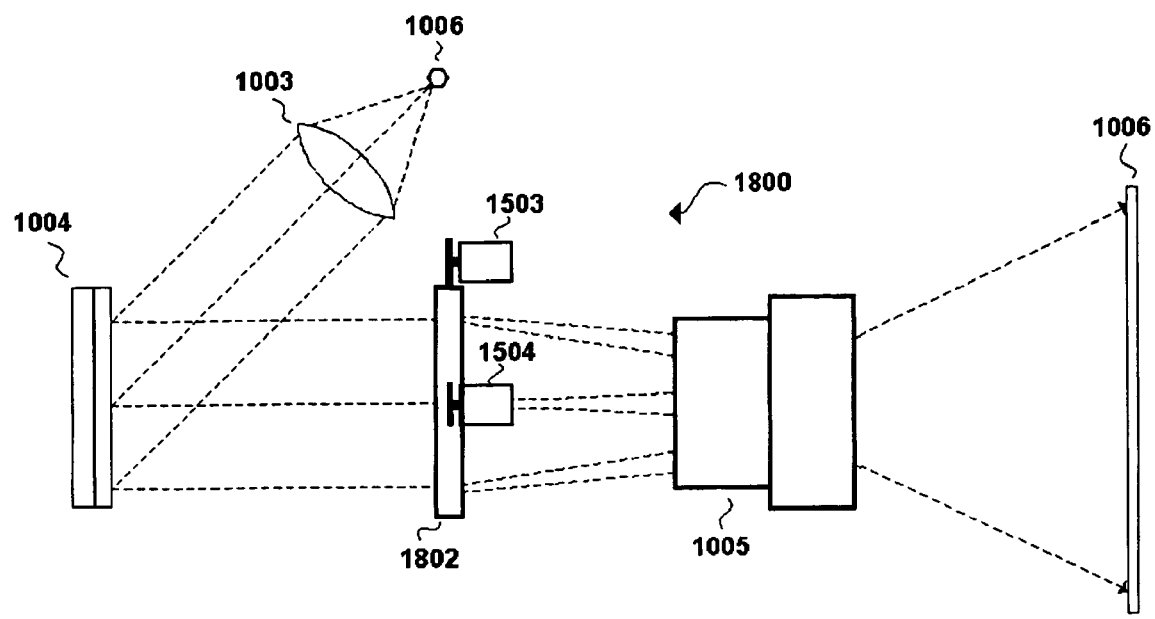
FIG. 18 illustrates a dynamic optical path using a moveable plane-parallel plate.

In another embodiment, a plane-parallel plate in the optical path is modulated by a linear actuator at two points, which are perpendicular to lens center plane, providing an image displacement in two axes. FIG. 18 illustrates the plane-parallel plate 1802 used in an optical system 1800. The linear actuators 1503, 1504 could be voice coils, piezoelectric elements or another of the diverse types of linear actuators. Light entering a plane-parallel plate is refracted upon entering an optical material and as the light propagates through the plate, it again refracts at the front and rear boundaries. As the plate 1802 is moved, the angle of orientation between the light ray and the plate can displace the direction of propagation moving the image. Unlike the curved lens of the previous embodiment, the plate is flat with light rays passing through as parallel rays and the displacement of the picture elements will be uniform. As with the curved lens embodiment of FIG. 17, the displacement of the image may be effected by modulating the optical properties of the plate 1802 rather than mechanically displacing it. Various integrated optic devices for modulating optical signals by the changing of the devices' indexes of refraction include various electro-optic modulators and acousto-optic modulators known in the art. The operation of these modulators is described, for example, in ROBERT G. HUNSBURGER, INTEGRATED OPTICS: THEORY AND TECHNOLOGY 120-57 (Springer-Verlag 1984), which is hereby incorporated herein solely for the purpose of describing techniques and devices for the integrated optic modulation of light without mechanical displacement of optical elements.

Advantages of this embodiment include the uniform displacement of all picture elements and the ability to have excellent control over the direction and amount of image displacement of an image. This method may be used to smooth an image as well as create additional picture element addressable locations.

While this invention has been described with reference to illustrative embodiments, this description is not intended to be construed in a limiting sense. A few embodiments have been described in detail herein. It is to be understood that the scope of the invention also comprehends embodiments different from those described, yet within the scope of the claims. Words of inclusion are to be interpreted as nonexhaustive in considering the scope of the invention. While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

The section headings in this application are provided for consistency with the parts of an application suggested under 37 CFR 1.77 or otherwise to provide organizational cues. These headings shall not limit or characterize the invention(s) set out in any patent claims that may issue from this application. Specifically and by way of example, although the headings refer to a "Technical Field," the language chosen under this heading to describe the so-called field of the invention should not limit the claims. Further, the "Summary and Method" is not to be considered as a characterization of the invention(s) set forth in the claims to this application. Multiple inventions may be set forth according to the limitations of the multiple claims associated with this patent specification, and the claims accordingly define the invention(s) that are protected thereby. In all instances, the scope of the claims shall be considered on their merits in light of the specification but should not be constrained by the headings included in this application.

Realizations in accordance with the present invention have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations, and data stores are illustrated in the context of specific configurations. Other allocations of functionality are envisioned and will fall within the scope of claims that follow. Finally, structures and functionality presented as discrete components in the exemplary configurations may be implemented as a combined structure or component. These and other variations, modifications, additions, and improvements may fall within the scope of the invention as defined in the claims that follow.

What is claimed is:

1. An optical system for projecting an image having x and y axes onto a image plane, the system comprising:
    an SLM device spaced from the image plane, the SLM device having a plurality of pixels operable to project pixels of the image onto the image plane and positioned such that the individual pixels of the projected image are oriented at substantially 45 degrees relative to the x and y axes of the image; and
    a modulating device positioned within an optical path between the SLM device and the image plane, the modulating device operable to create cyclical relative movement between the projected image and the image plane.

2. The system of claim 1 wherein the relative movement is in at least two dimensions.

3. The system of claim 2 wherein the relative movement in at least one dimension is approximately equal to one half the diagonal length of at least one of the projected pixels.

4. The system of claim 1 further comprising an optical element disposed between the SLM device and the image plane.

5. The system of claim 4 wherein the optical element is a double convex lens or a plane-parallel plate.

6. The system of claim 4 wherein the modulating device is a linear displacement device connected to and operable to selectively displace at least one of the SLM device and the optical element.

7. The system of claim 6 wherein the linear displacement device is selected from the group consisting of a motor, voice coils, and poled piezoelectric elements.

8. The system of claim 1 wherein the modulating device comprises an acousto-optic or an electro-optic modulator disposed between the SLM device and the image plane.

9. A method for projecting an image having x and y axes onto a image plane, the method comprising:

providing an SLM device spaced from the image plane, the SLM device having a plurality of pixels operable to project pixels of the image onto the image plane;

positioning the SLM device to orient the individual pixels of the projected image at substantially 45 degrees relative to the x and y axes of the image; and creating relative movement between the projected image and the image plane using a modulating device positioned within an optical path between the SLM device and the image plane.

10. The method of claim 9 wherein creating relative movement comprises displacing the SLM device a length approximately equal to one half the diagonal length of at least one of the projected pixels.

11. The method of claim 9 wherein creating relative movement comprises modulating the modulating device to affect the path of the projected image.

* * * * *